US010412770B2

United States Patent
Liu et al.

(10) Patent No.: US 10,412,770 B2
(45) Date of Patent: Sep. 10, 2019

(54) HYBRID NETWORKING IMPLEMENTATION METHOD, SYSTEM AND DEVICE AND COMPUTER STORAGE MEDIUM

(71) Applicant: ZTE CORPORATION, Shenzhen, Guangdong Province (CN)

(72) Inventors: Jun Liu, Shenzhen (CN); Yin Gao, Shenzhen (CN)

(73) Assignee: ZTE CORPORATION (CN)

( * ) Notice: Subject to any disclaimer, the term of this patent is extended or adjusted under 35 U.S.C. 154(b) by 2 days.

(21) Appl. No.: 15/325,092

(22) PCT Filed: Sep. 29, 2014

(86) PCT No.: PCT/CN2014/087816
§ 371 (c)(1),
(2) Date: May 2, 2017

(87) PCT Pub. No.: WO2016/008219
PCT Pub. Date: Jan. 21, 2016

(65) Prior Publication Data
US 2017/0238348 A1    Aug. 17, 2017

(30) Foreign Application Priority Data
Jul. 14, 2014 (CN) .......................... 2014 1 0334877

(51) Int. Cl.
*H04W 4/00* (2018.01)
*H04W 76/10* (2018.01)
(Continued)

(52) U.S. Cl.
CPC ......... *H04W 76/10* (2018.02); *H04L 61/2007* (2013.01); *H04W 88/08* (2013.01);
(Continued)

(58) Field of Classification Search
CPC ..... H04W 76/10; H04W 76/02; H04W 88/12; H04W 88/08; H04L 61/2007
See application file for complete search history.

(56) References Cited

U.S. PATENT DOCUMENTS

| | | | | |
|---|---|---|---|---|
| 2009/0232019 A1* | 9/2009 | Gupta | ................... | H04L 12/287 370/252 |
| 2010/0278108 A1* | 11/2010 | Cho | ...................... | H04W 76/12 370/328 |

(Continued)

FOREIGN PATENT DOCUMENTS

| | | |
|---|---|---|
| CN | 101873582 A | 10/2010 |
| CN | 101883352 A | 11/2010 |

(Continued)

OTHER PUBLICATIONS

Technical Specification Group Radio Access Network; Evolved Universal Terrestrial Radio Access (E-UTRA) and Evolved Universal Terrestrial Radio Access Network (E-UTRAN), Stage 2,(Release 10). 3GPP TS 36.300 V10.8.0, Jun. 2012.
(Continued)

*Primary Examiner* — Asad M Nawaz
*Assistant Examiner* — Syed Ali
(74) *Attorney, Agent, or Firm* — McDonald Hopkins LLC (57) ABSTRACT

A method, system and device for implementing hybrid networking and a computer storage medium, herein the method includes: a femto cell sending an IP type to which the femto cell belongs to a femto cell gateway (601); the femto cell gateway acquiring the IP type to which the femto cell belongs, and acquiring IPV4 addresses and/or IPV6 addresses sent by an MME (602); the femto cell gateway sending an IP address matched with the IP type to which the femto cell belongs to the femto cell (603); and the femto cell
(Continued)

acquiring the IP address sent by the femto cell gateway, and setting up a service bearer according to the IP address (604).

11 Claims, 5 Drawing Sheets

(51) Int. Cl.
    *H04W 88/08*         (2009.01)
    *H04W 88/12*         (2009.01)
    *H04L 29/12*          (2006.01)
    *H04W 84/04*         (2009.01)

(52) U.S. Cl.
    CPC ......... *H04W 88/12* (2013.01); *H04L 61/6059* (2013.01); *H04W 84/045* (2013.01)

(56) References Cited

U.S. PATENT DOCUMENTS

| | | | |
|---|---|---|---|
| 2012/0076121 A1* | 3/2012 | Choi | H04W 36/08 |
| | | | 370/338 |
| 2012/0177005 A1 | 7/2012 | Liang et al. | |
| 2012/0184294 A1* | 7/2012 | Stojanovski | H04W 48/17 |
| | | | 455/456.1 |
| 2012/0207129 A1* | 8/2012 | Sun | H04W 76/18 |
| | | | 370/331 |
| 2012/0275401 A1* | 11/2012 | Sun | H04W 76/18 |
| | | | 370/329 |
| 2012/0300750 A1* | 11/2012 | Chin | H04W 36/0022 |
| | | | 370/331 |
| 2013/0308527 A1* | 11/2013 | Chin | H04W 36/0022 |
| | | | 370/328 |
| 2014/0195655 A1* | 7/2014 | Jha | H04L 61/2575 |
| | | | 709/220 |
| 2015/0124780 A1* | 5/2015 | Ode | H04W 36/32 |
| | | | 370/331 |
| 2016/0088470 A1* | 3/2016 | Sivavakeesar | H04W 8/26 |
| 2016/0255540 A1* | 9/2016 | Kweon | H04W 76/15 |
| | | | 370/237 |

FOREIGN PATENT DOCUMENTS

| | | |
|---|---|---|
| CN | 102036329 A | 4/2011 |
| CN | 102256383 A | 11/2011 |
| WO | WO2010062093 A2 | 6/2010 |
| WO | 2015194890 A1 | 12/2015 |

OTHER PUBLICATIONS

Technical Specification Group Radio Access Network, Evolved Universal Terrestrial Radio Access (E-UTRA) and Evolved Universal Terrestrial Radio Access Network (E-UTRAN), 3GPP TS 36.300 v12.2.0, Jun. 2014, XP050774622.
ZTE, China Telecom; IP address selection; 3GPP TSG-RAN3 Meeting #85bis, Shanghai, China, Oct. 6-10, 2014; R3-142260,XP050877537.
China Telecom, Huawei, ZTE, NSN; MME control for consistance of S1-U and S1-MME address type, SA WG2 Meeting #103, Phoenix City, USA, May 19-23, 2014, S2-141579, XP050822257.
SA2; LS on MME control for consistence of S1-U and S1-MME address type, 3GPP TSG SA WG2 Meeting #103, Phoenix City, USA, May 19-23, 2014, S2-142009, XP050836511.

* cited by examiner

HYBRID NETWORKING IMPLEMENTATION METHOD, SYSTEM AND DEVICE AND COMPUTER STORAGE MEDIUM

TECHNICAL FIELD

The present disclosure relates to a home node B technology, and in particular to a method, system and device for implementing hybrid networking and a computer storage medium.

BACKGROUND

Figure 1:
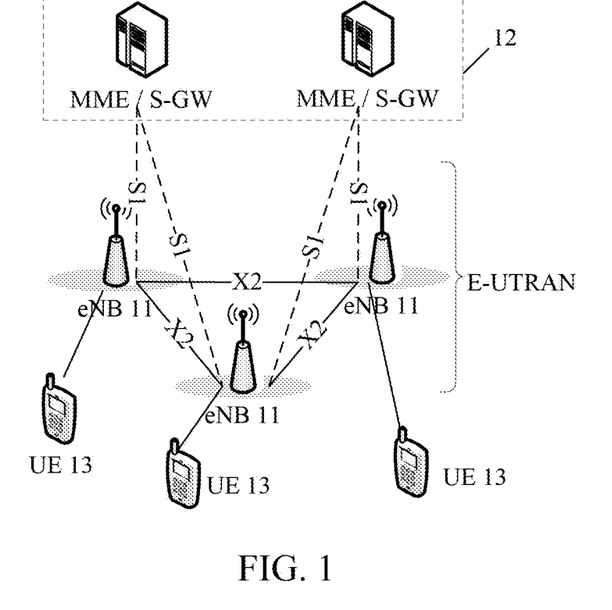
FIG. 1 is a schematic diagram of network architecture of an LTE system.

A Long Term Evolution (LTE) system is evolution of a 3G mobile communication system. FIG. 1 is a schematic diagram of network architecture of an LTE system. As illustrated in FIG. 1, the LTE system consists of three parts, i.e., evolved Nodes B (eNBs) 11, an Evolved Packet Core (EPC) 12 and User Equipment (UE) 13. The EPC includes Mobility Management Entities (MMEs) and Serving Gateways (S-GWs); and a plurality of eNBs 11 at an Evolved Universal Terrestrial Radio Access Network (E-URTAN) side access to MMEs 121/S-GWs 122 through S1 interfaces, and all the eNBs 11 are connected through X2 interfaces.

With the constantly expansion of macro-network scale, the number of users is continuously increased and data bandwidth demands of the users are continuously increased. Because frequency of use of 3rd-Generation (3G) mobile communication networks and LTE networks is relatively high, and as compared with the Global Systems of Mobile Communication (GSM), their signal penetrating ability is relatively poor, indoor coverage becomes a difficulty in network optimization, and the indoor coverage of the 3G networks or LTE networks is generally implemented by means of setting up indoor distribution systems. However, under existing conditions, the indoor distribution systems generally can only be set up in some hotels, medium-grade and high-grade residential districts or public hotspot places. For common residential districts, due to the limitation of various conditions, the indoor distribution systems cannot be set up. Therefore, indoor 3G or LTE signals are very weak and even there is no signal at all, causing a very big influence on user experience.

For this reason, a femto cell system is put forward. The used common broadband or operator transmission access is implemented by accessing a core network of a security gateway and an operator through the Internet, such that wireless signal coverage is provided for the users. The femto cell system mainly consists of femto cells and femto cell gateways, the femto cells are divided into 3G standard HNBs and LTE standard HeNBs according to the different used wireless technologies.

Figure 2:
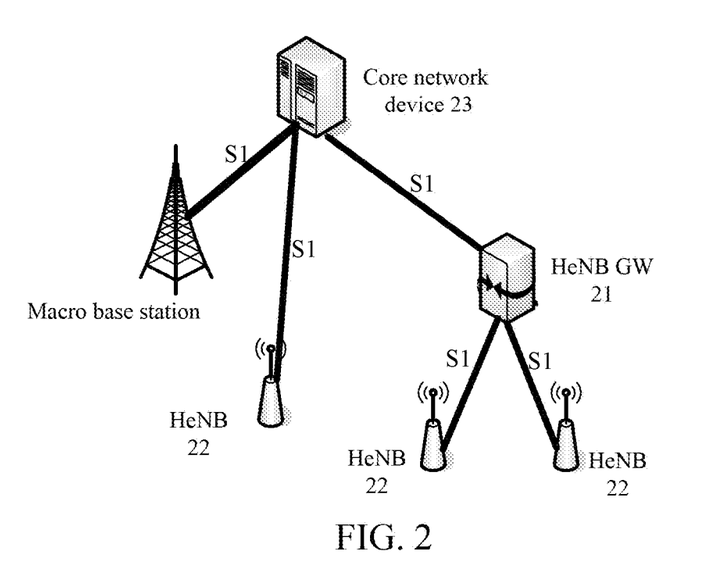
FIG. 2 is a schematic diagram of network element architecture of an LTE standard femto cell system.

FIG. 2 is a schematic diagram of network element architecture of an LTE standard femto cell system. As illustrated in FIG. 2, a home evolved node B gateway (HeNB GW) 21 is introduced into the LTE system and a plurality of HeNBs 22 are linked under the HeNB GW 21. Firstly, the HeNB GW 21 is connected to at least one HeNB 22 through an S1 link; and secondly, the HeNB GW 21 is further accessed to a core network device 23, which specifically may be an MME, through an S1 link. Besides, the HeNB 22 may also be directly accessed to the core network device 23 through an S1 link.

Each network element in the LTE system bears IP services through IP. The IP bearer may be Internet Protocol Version 4 (IPV4) and may also be Internet Protocol Version 6 (IPV6). Whether IPV4 or IPV6, neighboring network elements are required to use the same IP bearer. At present, an IP type is not carried in protocol S1 "INITIAL UE MESSAGE", thus the MME can only determine a service bearer type which needs to be assigned to a user through an S1 signaling bearer type, i.e., the service bearer type is the same as the S1 signaling bearer type, which causes no problem when macro base stations or the HeNBs 22 are directly connected with the MME. When the HeNBs 22 are connected with the MME through the HeNB GW 21, as long as the HeNB GW 21 can support conversion between IPV4 and IPV6, no problem is caused either. However, when the HeNBs 22 are linked with the MME through the HeNB GW 21 and a user plane does not pass through the HeNB GW 21, i.e., the service bearer between the HeNBs 22 and the MME is directly connected, the MME cannot know the bearer type of the HeNBs 22 at this moment. If the MME assigns an IPV6 address and the HeNB only supports IPV4, the service bearer between the HeNBs 22 and the MME cannot be successfully set up.

SUMMARY

In order to solve the technical problem existing in the existing technology, embodiments of the present disclosure provide a method, system and device for implementing hybrid networking and a computer storage medium, so as to solve the problem that a femto cell cannot set up a service bearer in LTE standard hybrid networking.

In order to achieve the above-mentioned object, technical schemes of embodiments of the present disclosure are implemented as follows.

An embodiment of the present disclosure provides a method for implementing hybrid networking, applied to a femto cell, including:

a femto cell sending an Internet Protocol (IP) type to which the femto cell belongs to a femto cell gateway; and the femto cell acquiring an IP address sent by the femto cell gateway and setting up a service bearer according to the IP address.

In another embodiment, the femto cell sending the IP type to which the femto cell belongs to the femto cell gateway includes:

the femto cell sending the IP type to which the femto cell belongs to the femto cell gateway through an S1 message.

In another embodiment, the S1 message is an S1 interface common message, and the S1 interface common message is one of the following messages:

S1 Setup Request and ENB Configuration Update.

In another embodiment, the S1 message is an S1 interface user equipment (UE) specific message, and the S1 interface UE specific message is one of the following messages:

Initial UE Message and Path Switch Request.

An embodiment of the present disclosure further provides a method for implementing hybrid networking, applied to a femto cell gateway, including:

a femto cell gateway acquiring an IP type to which a femto cell belongs, and acquiring IPV4 addresses and/or IPV6 addresses sent by a Mobility Management Entity (MME); and the femto cell gateway sending an IP address matched with the IP type to which the femto cell belongs to the femto cell.

In another embodiment, the femto cell gateway sending the IP address matched with the IP type to the femto cell includes:

the femto cell gateway receiving the IPV4 addresses and the IPV6 addresses sent by the MME; and selecting, according to the IP type to which the femto cell belongs, an IPV4 or IPV6 address matched with the IP type from the IPV4 addresses and the IPV6 addresses, and sending the IPV4 address or the IPV6 address to the femto cell.

In another embodiment, the femto cell gateway sending the IP address matched with the IP type to the femto cell includes:

the femto cell gateway sending the IP type to which the femto cell belongs to the MME; and the femto cell gateway receiving the IPV4 address or the IPV6 address matched with the IP type sent by the MME, and sending the IPV4 address or the IPV6 address to the femto cell.

An embodiment of the present disclosure further provides a method for implementing hybrid networking, applied to a Mobility Management Entity (MME), including:

the MME acquiring assigned IPV4 addresses and IPV6 addresses; and the MME sending the IPV4 addresses and/or the IPV6 addresses to a femto cell gateway.

In another embodiment, the MME sending the IPV4 addresses and/or the IPV6 addresses to the femto cell gateway includes:

the MME sending the assigned IPV4 addresses and IPV6 addresses to the femto cell gateway.

In another embodiment, the MME sending the IPV4 addresses and/or the IPV6 addresses to the femto cell gateway includes:

the MME receiving an IP type to which a femto cell belongs sent by the femto cell gateway; and selecting, according to the IP type, an IPV4 address or IPV6 address matched with the IP type from the IPV4 addresses and the IPV6 addresses, and sending the IPV4 address or the IPV6 address to the femto cell gateway.

An embodiment of the present disclosure further provides a method for implementing hybrid networking, including:

a femto cell sending an IP type to which the femto cell belongs to a femto cell gateway;

the femto cell gateway acquiring the IP type to which the femto cell belongs, and acquiring IPV4 addresses and/or IPV6 addresses sent by a Mobility Management Entity (MME) and sending an IP address matched with the IP type to which the femto cell belongs to the femto cell; and the femto cell acquiring the IP address sent by the femto cell gateway, and setting up a service bearer according to the IP address.

In another embodiment, the femto cell gateway acquiring the IPV4 addresses and/or the IPV6 addresses sent by the MME and sending the IP address matched with the IP type to which the femto cell belongs to the femto cell includes:

the MME sending assigned IPV4 addresses and IPV6 addresses to the femto cell gateway; and the femto cell gateway receiving the IPV4 addresses and the IPV6 addresses sent by the MME, selecting, according to the IP type to which the femto cell belongs, an IPV4 address or IPV6 address matched with the IP type from the IPV4 addresses and the IPV6 addresses, and sending the IPV4 address or the IPV6 address to the femto cell.

In another embodiment, the femto cell gateway acquiring the IPV4 addresses and/or the IPV6 addresses sent by the MME and sending the IP address matched with the IP type to which the femto cell belongs to the femto cell includes:

the femto cell gateway sending the IP type to which the femto cell belongs to the MME;

the MME receiving the IP type to which the femto cell belongs sent by the femto cell gateway, selecting, according to the IP type, an IPV4 address or IPV6 address matched with the IP type from the assigned IPV4 addresses and IPV6 addresses, and sending the IPV4 address or the IPV6 address to the femto cell gateway; and the femto cell gateway receiving the IPV4 address or the IPV6 address matched with the IP type sent by the MME, and sending the IPV4 address or the IPV6 address to the femto cell.

An embodiment of the present disclosure further provides a femto cell including: a first processing unit, a first sending unit and a first receiving unit, herein the first sending unit is arranged to send an Internet Protocol (IP) type to which the femto cell belongs to a femto cell gateway;

the first receiving unit is arranged to acquire an IP address sent by the femto cell gateway; and the first processing unit is arranged to set up a service bearer according to the IP address acquired by the first receiving unit.

In another embodiment, the first sending unit is arranged to send the IP type to which the femto cell belongs to the femto cell gateway through an S1 message.

An embodiment of the present disclosure further provides a femto cell gateway including: a second receiving unit and a second sending unit, herein the second receiving unit is arranged to receive an IP type to which a femto cell belongs, and is further arranged to receive IPV4 addresses and/or IPV6 addresses sent by a Mobility Management Entity (MME); and the second sending unit is arranged to send an IP address matched with the IP type to which the femto cell belongs received by the second receiving unit to the femto cell.

In another embodiment, the femto cell gateway further includes a second processing unit;

the second receiving unit is further arranged to receive the IPV4 addresses and the IPV6 addresses sent by the MME, and send the IPV4 addresses and the IPV6 addresses to the second processing unit;

the second processing unit is arranged to select, according to the IP type to which the femto cell belongs, an IPV4 address or the IPV6 address matched with the IP type from the IPV4 addresses and the IPV6 addresses received by the second receiving unit, and send the IPV4 address or the IPV6 address to the second sending unit; and the second sending unit is arranged to send the IPV4 address or the IPV6 address to the femto cell.

In another embodiment, the second sending unit is further arranged to send the IP type to which the femto cell belongs received by the second receiving unit to the MME, and is further arranged to send the IPV4 address or the IPV6 address received by the second receiving unit to the femto cell; and the second receiving unit is further arranged to receive the IPV4 address or the IPV6 address matched with the IP type to which the femto cell belongs sent by the MME, and send the IPV4 address or the IPV6 address to the second sending unit.

An embodiment of the present disclosure further provides a Mobility Management Entity (MME) including: an acquisition unit and a third sending unit, herein the acquisition unit is arranged to acquire assigned IPV4 addresses and IPV6 addresses; and the third sending unit is arranged to send the IPV4 addresses and/or the IPV6 addresses to a femto cell gateway.

In another embodiment, the third sending unit is arranged to send the assigned IPV4 addresses and IPV6 addresses acquired by the acquisition unit to the femto cell gateway.

In another embodiment, the MME further includes a third receiving unit and a third processing unit, herein the third receiving unit is arranged to receive an IP type to which a femto cell belongs sent by the femto cell gateway, and send the IP type to the third processing unit;

the third processing unit is arranged to select, according to the IP type, an IPV4 address or the IPV6 address matched with the IP type from the assigned IPV4 addresses and IPV6 addresses acquired by the acquisition unit, and send the IPV4 address or the IPV6 address to the third sending unit; and the third sending unit is arranged to send the IPV4 address or the IPV6 address to the femto cell gateway.

The embodiment of the present disclosure further provides a system for implementing hybrid networking including: a femto cell, a femto cell gateway and a Mobility Management Entity (MME), herein the femto cell is arranged to send an IP type to which the femto cell belongs to the femto cell gateway, and is further arranged to acquire an IP address sent by the femto cell gateway and set up a service bearer according to the IP address;

the femto cell gateway is arranged to acquire the IP type to which the femto cell belongs sent by the femto cell, and acquire IPV4 addresses and/or IPV6 addresses sent by the MME, and send an IP address matched with the IP type to which the femto cell belongs to the femto cell; and the MME is arranged to acquire assigned IPV4 addresses and IPV6 addresses, and is further arranged to send the IPV4 addresses and the IPV6 addresses to the femto cell gateway.

In another embodiment, the MME is arranged to send the assigned IPV4 addresses and IPV6 addresses to the femto cell gateway; and the femto cell gateway is arranged to receive the IPV4 addresses and the IPV6 addresses sent by the MME, select, according to the IP type to which the femto cell belongs, an IPV4 address or IPV6 address matched with the IP type from the IPV4 addresses and the IPV6 addresses, and send the IPV4 address or the IPV6 address to the femto cell.

In another embodiment, the femto cell gateway is arranged to send the IP type to which the femto cell belongs to the MME, and is further arranged to receive the IPV4 address or the IPV6 address matched with the IP type sent by the MME, and send the IPV4 address or the IPV6 address to the femto cell; and the MME is arranged to receive the IP type to which the femto cell belongs sent by the femto cell gateway, select, according to the IP type, the IPV4 address or the IPV6 address matched with the IP type from the assigned IPV4 addresses and IPV6 addresses, and send the IPV4 address or the IPV6 address to the femto cell gateway.

An embodiment of the present disclosure further provides a computer storage medium in which computer-executable instructions are stored and used for executing a method for implementing hybrid networking applied to a femto cell according to the embodiment of the present disclosure.

An embodiment of the present disclosure further provides a computer storage medium in which computer-executable instructions are stored and used for executing a method for implementing hybrid networking applied to a femto cell gateway according to the embodiment of the present disclosure.

An embodiment of the present disclosure further provides a computer storage medium in which computer-executable instructions are stored and used for executing a method for implementing hybrid networking applied to an MME according to the embodiment of the present disclosure.

In the method, system and device for implementing hybrid network and the computer storage medium provided by the embodiments of the present disclosure, a femto cell sends an IP type to which the femto cell belongs to a femto cell gateway; the femto cell gateway acquires IPV4 addresses and/or IPV6 addresses sent by an MME; the femto cell gateway sends an IP address matched with the IP type to which the femto cell belongs to the femto cell; and the femto cell acquires the IP address sent by the femto cell gateway, and sets up a service bearer according to the IP address. Thus, the setup of the service bearer by the femto cell in the LTE standard hybrid networking is implemented.

DETAILED DESCRIPTION

The present disclosure will be further described below in detail with reference to the drawings in combination with the specific embodiments.

Embodiment 1

Figure 3:
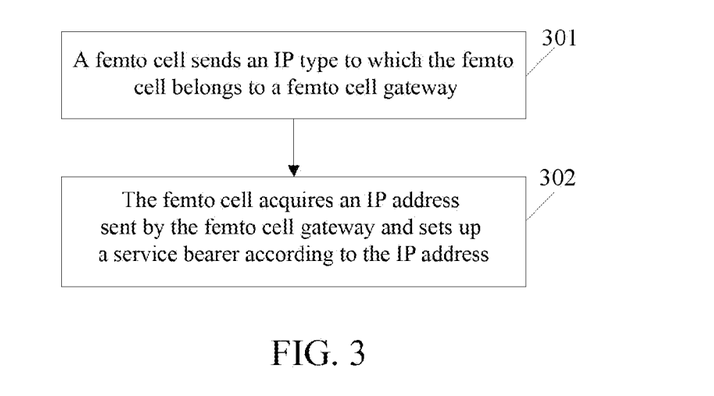
FIG. 3 is a flowchart of a method for implementing hybrid networking according to embodiment 1 of the present disclosure.

The embodiment of the present disclosure provides a method for implementing hybrid networking applied to a femto cell. FIG. 3 is a flowchart of a method for implementing hybrid networking according to embodiment 1 of the present disclosure. As illustrated in FIG. 3, the method includes the following steps.

In step 301, the femto cell sends an IP type to which the femto cell belongs to a femto cell gateway.

Here, the IP type to which the femto cell belongs means that the femto cell supports whether IPV4 or IPV6, and the femto cell sends a support situation of the IPV4 or the IPV6 to the femto cell gateway.

Herein, the femto cell sends the IP type to the femto cell gateway through an S1 message. Specifically, the S1 message may be an S1 interface common message, and the S1 interface common message may be one of the following messages: S1 SETUP REQUEST and ENB CONFIGURATION UPDATE, and is not limited to the two messages; and the S1 message may be an S1 interface UE specific message, and the S1 interface UE specific message may be one of the following messages: INITIAL UE MESSAGE and PATH SWITCH REQUEST, and is not limited to the two messages.

In step 302, the femto cell acquires an IP address sent by the femto cell gateway and sets up a service bearer according to the IP address.

Here, the femto cell gateway forwards the matched IP address selected by an MME for the femto cell to the femto cell, or the femto cell gateway selects the matched IP address from IPV4 addresses and IPV6 addresses sent by the MME according to the IP type to which the femto cell belongs, and sends the IP address to the femto cell.

The embodiment of the present disclosure further provides a computer storage medium having stored computer-executable instructions therein for executing the method for implementing hybrid networking applied to the femto cell according to the embodiment of the present disclosure.

Embodiment 2

Figure 4:
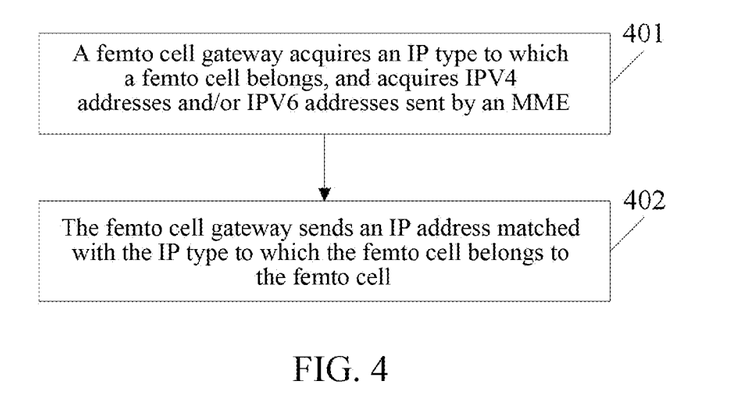
FIG. 4 is a flowchart of a method for implementing hybrid networking according to embodiment 2 of the present disclosure.

The embodiment of the present disclosure further provides a method for implementing hybrid networking method applied to a femto cell gateway. FIG. 4 is a flowchart of a method for implementing hybrid networking according to embodiment 2 of the present disclosure. As illustrated in FIG. 4, the method includes the following steps.

In step 401, a femto cell gateway acquires an IP type to which a femto cell belongs, and acquires IPV4 addresses and/or IPV6 addresses sent by an MME.

According to one aspect of this embodiment, after the femto cell gateway acquires the IP type sent by the femto cell, the femto cell gateway sends the IP type to the MME and the MME selects an IPV4 address or the IPV6 address matched with the IP type according to the IP type, herein the femto cell gateway sends the IP type to the MME through an S1 interface message.

According to another aspect of this embodiment, after the femto cell gateway acquires the IP type sent by the femto cell, the femto cell gateway saves the IP type, then receives the IPV4 addresses and the IPV6 addresses sent by the MME, and selects the IPV4 address or the IPV6 address matched with the IP type from the IPV4 addresses and the IPV6 addresses according to the saved IP type, herein the MME sends the IPV4 address or the IPV6 address to the femto cell gateway through an S1 interface message.

In step 402, the femto cell gateway sends an IP address matched with the IP type to which the femto cell belongs to the femto cell.

Here, the femto cell gateway sends the IPV4 address or the IPV6 address to the femto cell through an S1 interface message.

The embodiment of the present disclosure further provides a computer storage medium having stored computer-executable instructions therein for executing the method for implementing hybrid networking applied to the femto cell gateway according to the embodiment of the present disclosure.

Embodiment 3

Figure 5:
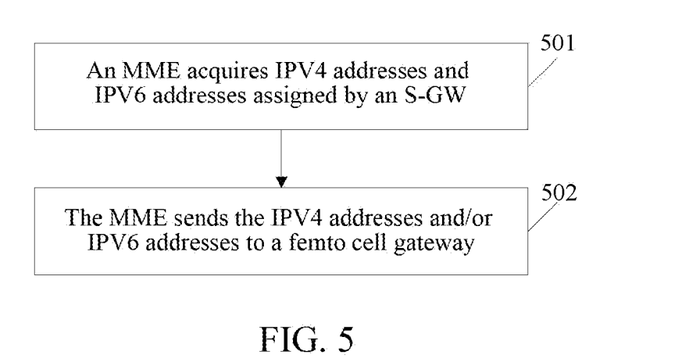
FIG. 5 is a flowchart of a method for implementing hybrid networking according to embodiment 3 of the present disclosure.

The embodiment of the present disclosure further provides a method for implementing hybrid networking applied to an MME. FIG. 5 is a flowchart of a method for implementing hybrid networking according to embodiment 3 of the present disclosure. As illustrated in FIG. 5, the method includes the following steps.

In step 501, an MME acquires the assigned IPV4 addresses and IPV6 addresses.

Here, an S-GW assigns IP addresses, including IPV4 addresses and IPV6 addresses, and sends the IPV4 addresses and the IPV6 addresses to the MME.

In step 502, the MME sends the IPV4 addresses and/or the IPV6 addresses to a femto cell gateway.

According to one aspect of this embodiment, the MME receives an IP type sent by the femto cell gateway, selects an IPV4 address or IPV6 address matched with the IP type from the assigned IPV4 addresses and IPV6 addresses according to the IP type, and sends the IPV4 address or the IPV6 address to the femto cell gateway, herein the MME sends the IPV4 address or the IPV6 address to the femto cell gateway through an S1 interface message.

According to another aspect of this embodiment, the MME directly sends the assigned IPV4 addresses and IPV6 addresses to the femto cell gateway, herein the MME sends the IPV4 addresses and the IPV6 addresses to the femto cell gateway through an S1 interface message.

The embodiment of the present disclosure further provides a computer storage medium having stored computer-executable instructions therein for executing the method for implementing hybrid networking applied to the MME according to the embodiment of the present disclosure.

Embodiment 4

Figure 6:
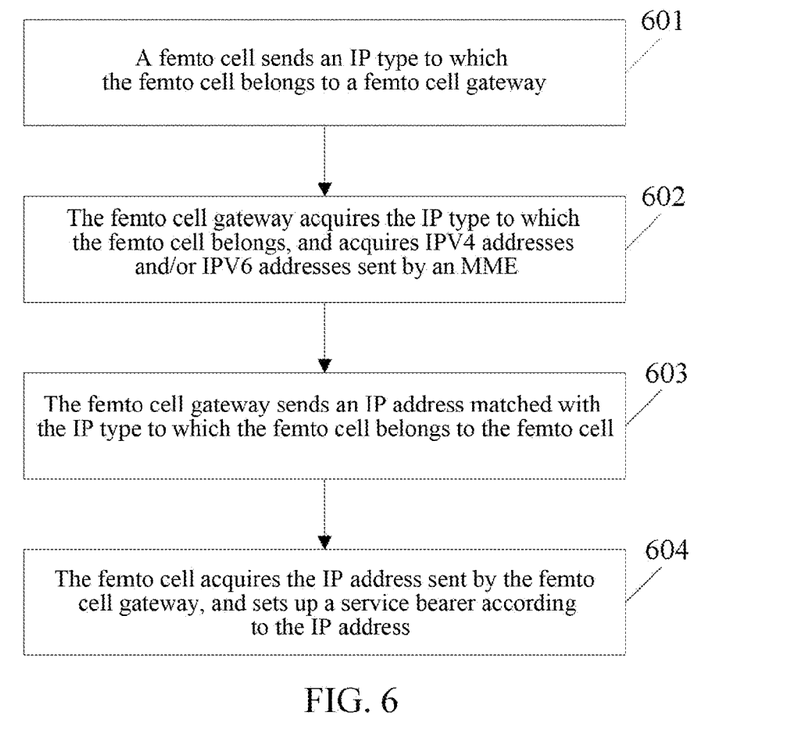
FIG. 6 is a flowchart of a method for implementing hybrid networking according to embodiment 4 of the present disclosure.

The embodiment of the present disclosure further provides a method for implementing hybrid networking. FIG. 6 is a flowchart of a method for implementing hybrid networking according to embodiment 4 of the present disclosure. As illustrated in FIG. 6, the method includes the following steps.

In step 601, a femto cell sends an IP type to which the femto cell belongs to a femto cell gateway.

Here, the IP type to which the femto cell belongs means that the femto cell supports whether IPV4 or IPV6, and the femto cell sends a support situation of the IPV4 or the IPV6 to the femto cell gateway.

Herein, the femto cell sends the IP type to the femto cell gateway through an S1 message. Specifically, the S1 message may be an S1 interface common message, and the S1 interface common message may be one of the following messages: S1 SETUP REQUEST and ENB CONFIGURATION UPDATE, and is not limited to the two messages; and the S1 message may be an S1 interface UE specific message, and the S1 interface UE specific message may be one of the following messages: INITIAL UE MESSAGE and PATH SWITCH REQUEST, and is not limited to the two messages.

In step 602, the femto cell gateway acquires the IP type to which the femto cell belongs, and acquires IPV4 addresses and/or IPV6 addresses sent by an MME.

According to one aspect of this embodiment, after the femto cell gateway acquires the IP type sent by the femto cell, the femto cell gateway sends the IP type to the MME and the MME selects an IPV4 address or IPV6 address matched with the IP type according to the IP type, herein the femto cell gateway sends the IP type to the MME through an S1 interface message.

Correspondingly, the MME receives the IP type sent by the femto cell gateway, selects the IPV4 address or the IPV6 address matched with the IP type from the assigned IPV4 addresses and IPV6 addresses according to the IP type, and sends the IPV4 address or the IPV6 address to the femto cell gateway, herein the MME sends the IPV4 address or the IPV6 address to the femto cell gateway through an S1 interface message.

According to another aspect of this embodiment, after the femto cell gateway acquires the IP type sent by the femto cell, the femto cell gateway saves the IP type, then receives the IPV4 addresses and the IPV6 addresses sent by the MME, and selects the IPV4 address or the IPV6 address matched with the IP type from the IPV4 addresses and the IPV6 addresses according to the saved IP type, herein the MME sends the IPV4 address or the IPV6 address to the femto cell gateway through an S1 interface message.

Correspondingly, the MME directly sends the assigned IPV4 addresses or IPV6 addresses to the femto cell gateway, herein the MME sends the IPV4 addresses and the IPV6 addresses to the femto cell gateway through an S1 interface message.

In step 603, the femto cell gateway sends an IP address matched with the IP type to which the femto cell belongs to the femto cell.

Herein, the femto cell gateway sends the IPV4 address or the IPV6 address to the femto cell through an S1 interface message.

In step 604, the femto cell acquires the IP address sent by the femto cell gateway, and sets up a service bearer according to the IP address.

Here, the femto cell gateway forwards the matched IP address selected by the MIME for the femto cell to the femto cell, or the femto cell gateway selects the matched IP address from the IPV4 addresses and the IPV6 addresses sent by the MME according to the IP type to which the femto cell belongs, and sends the IP address to the femto cell.

The embodiment of the present disclosure will be further described below in detail by taking a femto cell as an HeNB and a femto cell gateway as an HeNB GW as examples in embodiment 5 to embodiment 7.

Embodiment 5

Figure 7:
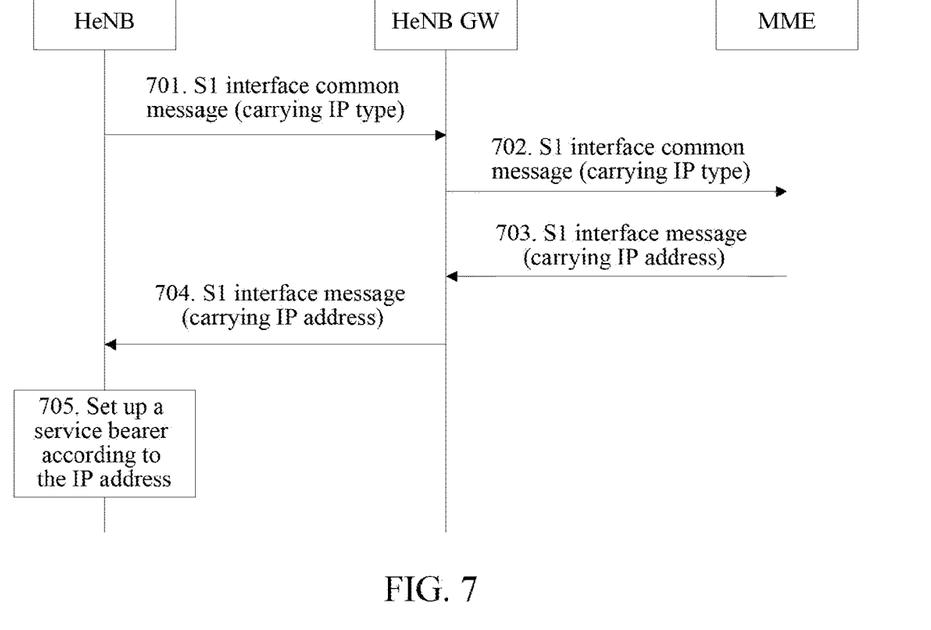
FIG. 7 is a flowchart of a method for implementing hybrid networking according to embodiment 5 of the present disclosure.

The embodiment of the present disclosure further provides a method for implementing hybrid networking. FIG. 7 is a flowchart of a method for implementing hybrid networking according to embodiment 5 of the present disclosure As illustrated in FIG. 7, the method includes the following steps.

In step 701, an HeNB sends an IP type of a network in which the HeNB is located to an HeNB GW through an S1 interface common message.

Here, the S1 interface common message may be one of the following messages: S1 SETUP REQUEST and ENB CONFIGURATION UPDATE, and is not limited to the two messages. Herein, the IP type is sent to the HeNB GW by carrying the IP type in the S1 interface common message.

Herein, the IP type means that the HeNB supports whether IPV4 or IPV6.

In step 702, the HeNB GW sends the IP type of the HeNB to an MME by carrying the IP type in an uplink S1 interface common message.

Here, the S1 interface common message may be one of the following messages: S1 SETUP REQUEST and ENB CONFIGURATION UPDATE, and is not limited to the two messages. Herein, identity information of the HeNB connected with the HeNB GW is carried in the S1 interface common message, and may include: HeNB global ID and HeNB supported IP type, which indicates that the HeNB supports whether IPV4 or IPV6.

In step 703, the MME selects an IP address matched with the IP type according to the IP type and sends the IP address to the HeNB GW through a downlink S1 interface message.

Here, the MME selects an IPV4 address or an IPV6 address matched with the IP type according to the IP type indicating that the HeNB supports whether IPV4 or IPV6, and sends the IPV4 address or the IPV6 address to the HeNB GW.

In step 704, the HeNB GW forwards the assigned IP address to the HeNB.

Here, the HeNB GW sends the IPV4 address or the IPV6 address to the HeNB through an S1 interface message.

In step 705, the HeNB sets up a service bearer according to the received IP address.

Embodiment 6

Figure 8:
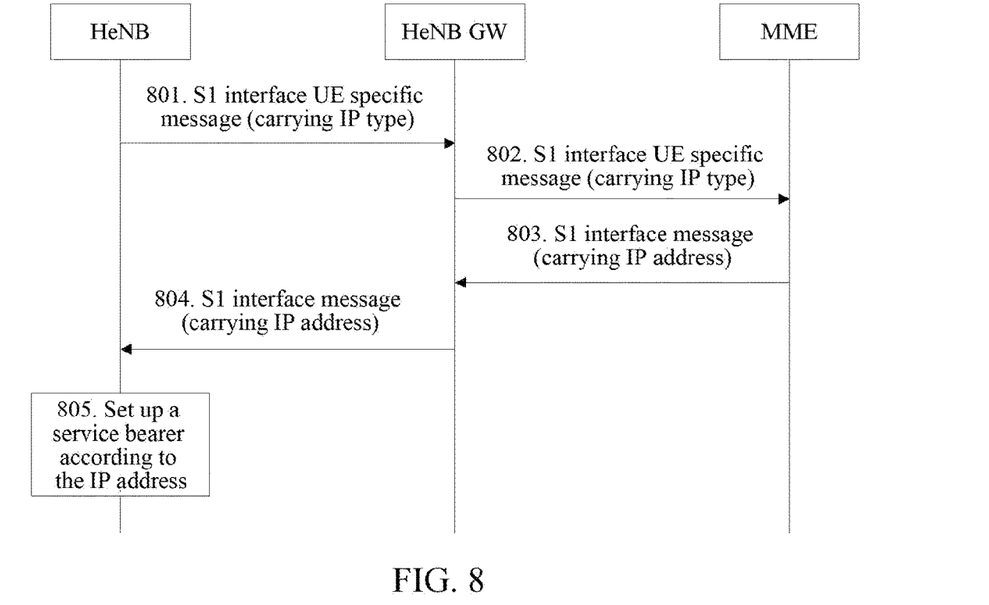
FIG. 8 is a flowchart of a method for implementing hybrid networking according to embodiment 6 of the present disclosure.

The embodiment of the present disclosure further provides a method for implementing hybrid networking. FIG. 8 is a flowchart of a method for implementing hybrid networking according to embodiment 6 of the present disclosure. As illustrated in FIG. 8, the method includes the following steps.

In step 801, an HeNB sends an IP type of a network in which the HeNB is located to an HeNB GW through an S1 interface UE specific message.

Here, the S1 interface UE specific message may be one of the following messages: INITIAL UE MESSAGE and PATH SWITCH REQUEST, and is not limited to the two messages. Herein, the IP type is sent to the HeNB GW by carrying the IP type in the S1 interface UE specific message.

Herein, the IP type means that the HeNB supports whether IPV4 or IPV6.

In step 802, the HeNB GW sends the IP type of the HeNB to an MME by carrying the IP type in an uplink S1 interface UE specific message.

Here, the S1 interface UE specific message may be one of the following messages: INITIAL UE MESSAGE and PATH SWITCH REQUEST, and is not limited to the two messages. Herein, identity information of the HeNB connected with the HeNB GW is carried in the S1 interface UE specific message, and may include: HeNB global ID and HeNB supported IP type, which indicates that the HeNB supports whether IPV4 or IPV6.

In step 803, the MME selects an IP address matched with the IP type according to the IP type and sends the IP address to the HeNB GW through a downlink message.

Here, the MME selects an IPV4 address or an IPV6 address matched with the IP type according to the IP type indicating that the HeNB supports whether IPV4 or IPV6, and sends the IPV4 address or the IPV6 address to the HeNB GW.

In step 804, the HeNB GW forwards the assigned IP address to the HeNB.

Here, the HeNB GW sends the IPV4 address or the IPV6 address to the HeNB through an S1 interface message.

In step 805, the HeNB sets up a service bearer according to the received IP address.

Embodiment 7

Figure 9:
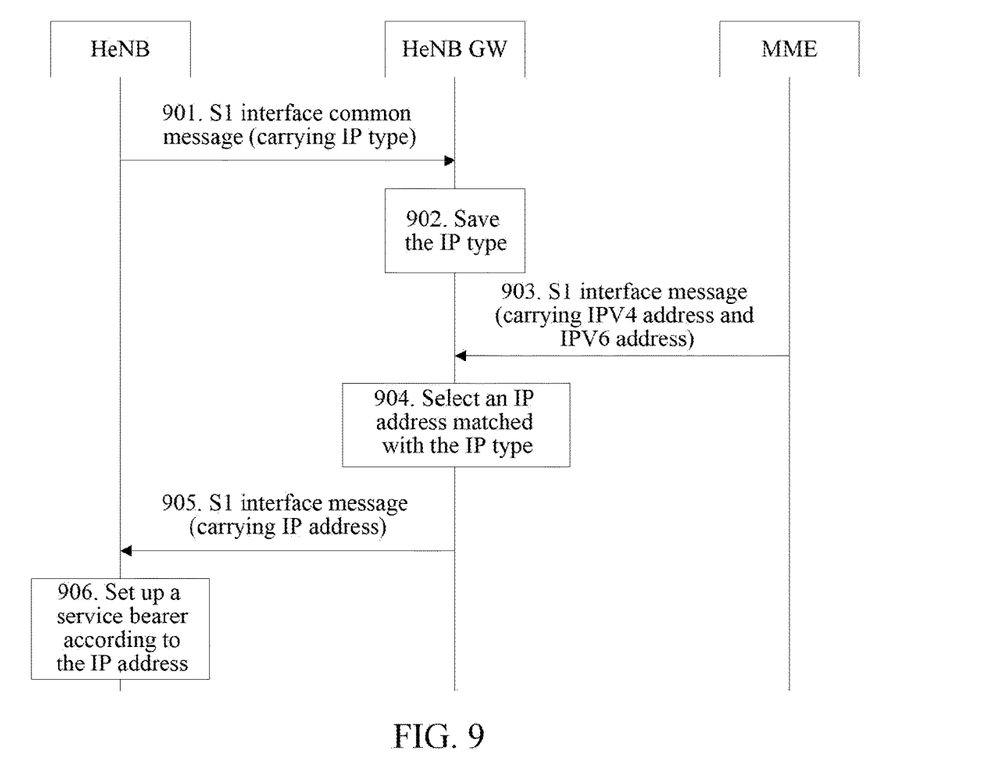
FIG. 9 is a flowchart of a method for implementing hybrid networking according to embodiment 7 of the present disclosure.

The embodiment of the present disclosure further provides a method for implementing hybrid networking. FIG. 9 is a flowchart of a method for implementing hybrid networking according to embodiment 7 of the present disclosure. As illustrated in FIG. 9, the method includes the following steps.

In step 901, an HeNB sends an IP type of a network in which the HeNB is located to an HeNB GW through an S1 interface common message.

Here, the S1 interface common message may be one of the following messages: S1 SETUP REQUEST and ENB CONFIGURATION UPDATE, and is not limited to the two messages. Herein, the IP type is sent to the HeNB GW by carrying the IP type in the S1 interface common message.

Herein, the IP type means that the HeNB supports whether IPV4 or IPV6.

In step 902, the HeNB GW saves the IP type.

In step 903, an MME sends IPV4 addresses and IPV6 addresses assigned by an S-GW to the HeNB GW through a downlink message.

Here, the MME sends the IPV4 addresses and the IPV6 addresses to the HeNB GW through a downlink S1 interface message.

In step 904, the HeNB GW selects an IPV4 address or IPV6 address matched with the IP type from the IPV4 addresses and the IPV6 addresses sent by the MME according to the saved IP type to which the HeNB belongs.

Here, the HeNB GW selects the IPV4 or the IPV6 matched with the IP type according to the IP type indicating that the HeNB supports whether IPV4 or IPV6.

In step 905, the IPV4 address or the IPV6 address is sent to the HeNB.

Here, the HeNB GW sends the IPV4 address or the IPV6 address to the HeNB through an S1 interface message.

In step 906, the HeNB sets up a service bearer according to the received IP address.

Embodiment 8

Figure 10:
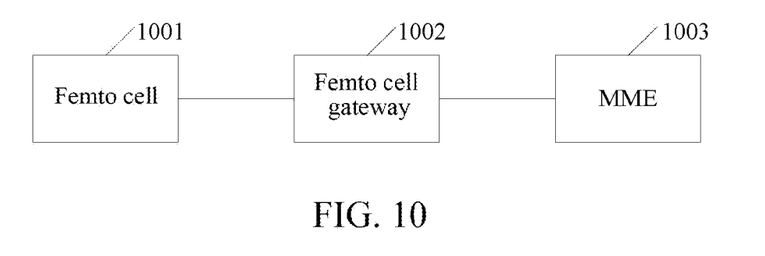
FIG. 10 is a structure schematic diagram of a system for implementing hybrid networking according to an embodiment of the present disclosure.

The embodiment of the present disclosure further provides a system for implementing hybrid networking. FIG. 10 is a structure schematic diagram of a system for implementing hybrid networking according to the embodiment of the present disclosure. As illustrated in FIG. 10, the system includes: a femto cell 1001, a femto cell gateway 1002 and an MME 1003.

The femto cell 1001 is arranged to send an IP type to which the femto cell belongs to the femto cell gateway 1002, and is further arranged to acquire an IP address sent by the femto cell gateway 1002 and set up a service bearer according to the IP address.

The femto cell gateway 1002 is arranged to acquire the IP type to which the femto cell belongs sent by the femto cell 1001, acquire IPV4 addresses and/or IPV6 addresses sent by the MME 1003; and send an IP address matched with the IP type to which the femto cell belongs to the femto cell 1001.

The MME 1003 is arranged to acquire the assigned IPV4 addresses and IPV6 addresses, and is further arranged to send the IPV4 addresses and the IPV6 addresses to the femto cell gateway 1002.

Specifically, the femto cell 1001 is arranged to send the IP type to the femto cell gateway 1002 through an S1 message. Specifically, the S1 message may be an S1 interface common message, and the S1 interface common message may be one of the following messages: S1 SETUP REQUEST and ENB CONFIGURATION UPDATE, and is not limited to the two messages; and the S1 message may be an S1 interface UE specific message, and the S1 interface UE specific message may be one of the following messages: INITIAL UE MESSAGE and PATH SWITCH REQUEST, and is not limited to the two messages.

According to one aspect of this embodiment, the femto cell gateway 1002 is arranged to acquire the IP type sent by the femto cell 1001, and is further arranged to receive the IPV4 addresses and the IPV6 addresses sent by the MME 1003, select an IPV4 address or IPV6 address matched with the IP type from the IPV4 addresses and the IPV6 addresses according to the IP type to which the femto cell 1001 belongs, and send the IPV4 address or the IPV6 address to the femto cell 1001.

Correspondingly, the MME 1003 is arranged to directly send the assigned IPV4 addresses and IPV6 addresses to the femto cell gateway 1002.

According to another aspect of this embodiment, the femto cell gateway 1002 is arranged to acquire the IP type to which the femto cell 1001 belongs sent by the femto cell 1001, and send the IP type to the MME 1003, and is further arranged to receive the IPV4 address or the IPV6 address matched with the IP type sent by the MME 1003, and send the IPV4 address or the IPV6 address to the femto cell 1001.

Correspondingly, the MME 1003 is arranged to receive the IP type to which the femto cell 1001 belongs sent by the femto cell gateway 1002, select the IPV4 address or the IPV6 address matched with the IP type from the assigned IPV4 addresses and IPV6 addresses according to the IP type, and send the IPV4 address or the IPV6 address to the femto cell gateway 1002.

Embodiment 9

Figure 11:
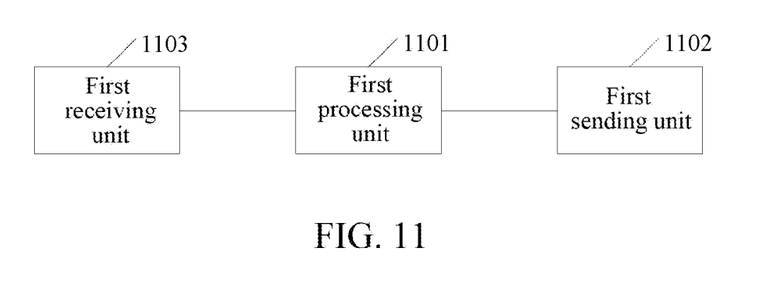
FIG. 11 is a structure schematic diagram of a femto cell according to an embodiment of the present disclosure.

The embodiment of the present disclosure further provides a femto cell. FIG. 11 is a structure schematic diagram of a femto cell according to the embodiment of the present disclosure. As illustrated in FIG. 11, the femto cell includes: a first processing unit 1101, a first sending unit 1102 and a first receiving unit 1103.

The first sending unit 1102 is arranged to send an IP type to which the femto cell belongs to a femto cell gateway.

The first receiving unit 1103 is arranged to acquire an IP address sent by the femto cell gateway.

The first processing unit 1101 is arranged to set up a service bearer according to the IP address acquired by the first receiving unit 1103.

Specifically, the first sending unit 1102 is arranged to send the IP type to the femto cell gateway through an S1 message. The S1 message may be an S1 interface common message, and the S1 interface common message may be one of the following messages: S1 SETUP REQUEST and ENB CONFIGURATION UPDATE, and is not limited to the two messages; and the S1 message may be an S1 interface UE specific message, and the S1 interface UE specific message may be one of the following messages: INITIAL UE MESSAGE and PATH SWITCH REQUEST, and is not limited to the two messages.

Those skilled in the art should understand that functions of each processing unit in the femto cell according to the embodiments of the present disclosure may be understood by referring to the relevant description about the methods for implementing hybrid networking described above. Each processing unit in the femto cell according to the embodiments of the present disclosure may be implemented through an analog circuit which implements functions described in the embodiments of the present disclosure, and may also be implemented through the operation of software, which executes the functions described in the embodiments of the present disclosure, on a smart terminal.

In the embodiment, in actual application, the first processing unit 1101 in the femto cell may be implemented through a Central Processing Unit (CPU), a Digital Signal Processor (DSP) or a Field Programmable Gate Array (FPGA) in the femto cell. In actual application, the first sending unit 1102 in the femto cell may be implemented through a transmitting machine or a transmitter in the femto cell; and in actual application, the first receiving unit 1103 in the femto cell may be implemented through a receiving machine or a receiver in the femto cell.

Embodiment 10

Figure 12:
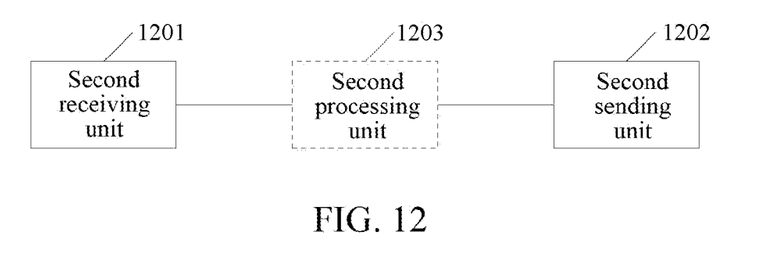
FIG. 12 is a structure schematic diagram of a femto cell gateway according to an embodiment of the present disclosure.

The embodiment of the present disclosure further provides a femto cell gateway. FIG. 12 is a structure schematic diagram of a femto cell gateway according to the embodiment of the present disclosure. As illustrated in FIG. 12, the femto cell gateway includes: a second receiving unit 1201 and a second sending unit 1202.

The second receiving unit 1201 is arranged to receive an IP type to which a femto cell belongs, and is further arranged to receive IPV4 addresses and/or IPV6 addresses sent by an MME.

The second sending unit 1202 is arranged to send an IP address matched with the IP type to which the femto cell belongs received by the second receiving unit 1201 to the femto cell.

According to one respect of the embodiment, the femto cell gateway further includes a second processing unit 1203.

The second receiving unit 1201 is further arranged to receive the IPV4 addresses and the IPV6 addresses sent by the MME, and send the IPV4 addresses and the IPV6 addresses to the second processing unit 1203.

The second processing unit 1203 is arranged to select an IPV4 address or IPV6 address matched with the IP type from the IPV4 addresses and the IPV6 addresses according to the IP type to which the femto cell belongs received by the second receiving unit 1201, and send the IPV4 address or the IPV6 address to the second sending unit 1202.

The second sending unit 1202 is arranged to send the IPV4 address or the IPV6 address to the femto cell.

According to another aspect of the embodiment, the second sending unit 1202 is further arranged to send the IP type to which the femto cell belongs received by the second receiving unit 1201 to the MME, and is further arranged to send the IPV4 address or the IPV6 address received by the second receiving unit 1201 to the femto cell.

The second receiving unit 1201 is further arranged to receive the IPV4 address or the IPV6 address matched with the IP type to which the femto cell belongs sent by the MME, and send the IPV4 address or the IPV6 address to the second sending unit 1202.

Those skilled in the art should understand that functions of each processing unit in the femto cell gateway according to the embodiments of the present disclosure may be understood by referring to the relevant description about the methods for implementing hybrid networking described above. Each processing unit in the femto cell gateway according to the embodiments of the present disclosure may be implemented through an analog circuit which implements functions described in the embodiments of the present disclosure, and may also be implemented through the operation of software, which executes the functions described in the embodiments of the present disclosure, on a smart terminal.

In the embodiment, in actual application, the second processing unit 1203 in the femto cell gateway may be implemented through a CPU, a DSP or an FPGA in the femto cell gateway. In actual application, the second sending unit 1202 in the femto cell gateway may be implemented through a transmitting machine or a transmitter in the femto cell gateway; and in actual application, the second receiving unit 1201 in the femto cell gateway may be implemented through a receiving machine or a receiver in the femto cell gateway.

Embodiment 11

Figure 13:
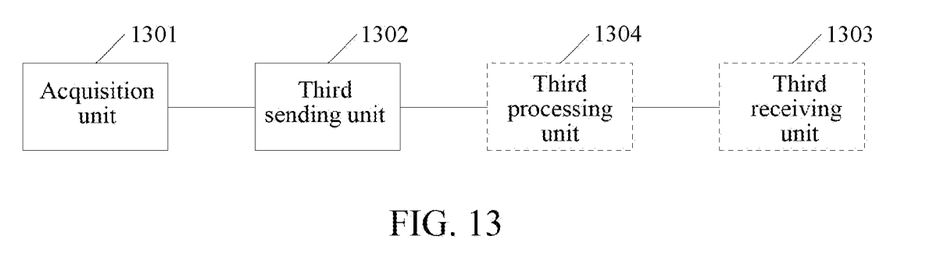
FIG. 13 is a structure schematic diagram of an MME according to an embodiment of the present disclosure.

The embodiment of the present disclosure further provides an MME. FIG. 13 is a structure schematic diagram of an MME according to the embodiment of the present disclosure. As illustrated in FIG. 13, the MME includes: an acquisition unit 1301 and a third sending unit 1302.

The acquisition unit 1301 is arranged to acquire the assigned IPV4 addresses and IPV6 addresses.

The third sending unit 1302 is arranged to send the IPV4 addresses and/or the IPV6 addresses to a femto cell gateway.

According to one respect of the embodiment, the third sending unit 1302 is arranged to send the assigned IPV4 addresses and IPV6 addresses acquired by the acquisition unit 1301 to the femto cell gateway.

According to another aspect of this embodiment, the MME further includes a third receiving unit 1303 and a third processing unit 1304.

The third receiving unit 1303 is arranged to receive an IP type to which a femto cell belongs sent by the femto cell gateway, and send the IP type to the third processing unit 1304.

The third processing unit 1304 is arranged to select an IPV4 address or IPV6 address matched with the IP type from the assigned IPV4 addresses and IPV6 addresses acquired by the acquisition unit 1301 according to the IP type, and send the IPV4 address or the IPV6 address to the third sending unit 1302.

The third sending unit 1302 is arranged to send the IPV4 address or the IPV6 address to the femto cell gateway.

Those skilled in the art should understand that functions of each processing unit in the MME according to the embodiments of the present disclosure may be understood by referring to the relevant description about the methods for implementing hybrid networking described above. Each processing unit in the MME according to the embodiments of the present disclosure may be implemented through an analog circuit which implements functions described in the embodiments of the present disclosure, and may also be implemented through the operation of software, which executes the functions described in the embodiments of the present disclosure, on a smart terminal.

In the embodiment, in actual application, the third processing unit 1304 in the MME may be implemented through a CPU, a DSP or an FPGA in the MME. In actual application, the third sending unit 1302 in the MME may be implemented through a transmitting machine or a transmitter in the MME; and in actual application, the third receiving unit 1303 and the acquisition unit 1301 in the MME may be implemented through a receiving machine or a receiver in the MME.

Those skilled in the art shall understand that the embodiments of the present disclosure may be provided in the form of methods, systems or computer program products. Therefore, the present disclosure may adopt the form of hardware embodiments, software embodiments or a combination of software and hardware embodiments. In addition, the present disclosure may adopt the form of computer program products implemented in one or more of computer usable memory media (including but not limited to disk memories, optical memories, etc.) containing computer usable program codes therein.

The present disclosure is described by referring to flowcharts and/or block diagrams of the methods, the devices (systems) and the computer program products according to the embodiments of the present disclosure. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded computers or other programmable data processing devices to produce a machine, such that instructions executed through processors of computers or other programmable data processing devices can generate apparatuses for implementing functions designated in one or more processes of the flowcharts and/or one or more blocks of the block diagrams.

These computer program instructions may also be stored in computer-readable memories which can guide computers or other programmable data processing devices to work in a specific manner, such that the instructions stored in the computer-readable memories can generate articles of manufacture including instruction devices, which implement functions designated in one or more processes of the flowcharts and/or one or more blocks of the block diagrams.

These computer program instructions may also be loaded into computers or other programmable data processing devices, such that a series of operation steps are executed on the computers or other programmable devices to perform processing implemented by the computers, thereby providing steps for implementing functions designated in one or more processes of the flowcharts and/or one or more blocks of the block diagrams using the instructions which are executed on the computers or other programmable devices provide.

The above-mentioned embodiments are just alternative embodiments of the present disclosure and are not intended to limit the protection scope of the present disclosure.

INDUSTRIAL APPLICABILITY

According to the embodiments of the present disclosure, a femto cell gateway selects an IPV4 address or an IPV6 address matched with an IP type from the assigned IPV4 addresses and IPV6 addresses according to the IP type to which a femto cell belongs, and sends the IPV4 address or the IPV6 address to the femto cell; or an MME selects the IPV4 address or the IPV6 address matched with the IP type from the assigned IPV4 addresses or IPV6 addresses according to the IP type to which the femto cell belongs, and sends the IPV4 address or the IPV6 address to the femto cell through the femto cell gateway. Thus, the setup of a service bearer by the femto cell in LTE standard hybrid networking is implemented.

What we claimed is:

1. A method for implementing hybrid networking, applied to a Home evolved Node B (HeNB), comprising:
    the HeNB sending an Internet Protocol (IP) version supported by the HeNB, which refers to whether the HeNB supports IPV4 or IPV6, to a HeNB gateway, wherein the HeNB is linked with a Mobility Management Entity (MME) via the HeNB gateway and a user plane does not pass through the HeNB gateway; and
    the HeNB receiving from the HeNB gateway an IP address matched with the IP version supported by the HeNB, wherein the HeNB gateway selects, from IPV4 addresses and IPV6 addresses sent by the MME, the IP address matched with the IP version supported by the HeNB, and sends the selected IP address to the HeNB; and
    setting up a service bearer according to the IP address;
    wherein the HeNB sending the IP version supported by the HeNB to the HeNB gateway comprises:
    the HeNB sending the IP version supported by the HeNB to the HeNB gateway through an S1 message;
    wherein the S1 message is an S1 interface common message, and the S1 interface common message is one of the following messages: S1 SETUP REQUEST, and ENB CONFIGURATION UPDATE; or
    the S1 message is an S1 interface user equipment (UE) specific message, and the S1 interface UE specific message is one of the following messages: INITIAL UE MESSAGE, and PATH SWITCH REQUEST.

2. A non-transitory computer storage medium, in which computer-executable instructions are stored and used for executing steps defined in claim 1.

3. A method for implementing hybrid networking, applied to a Home evolved Node B (HeNB) gateway, comprising:
    the HeNB gateway acquiring an Internet Protocol (IP) version supported by an HeNB, which refers to whether the HeNB supports IPV4 or IPV6, and acquiring Internet Protocol Version 4 (IPV4) addresses and Internet Protocol Version 6 (IPV6) addresses sent by a Mobility Management Entity (MME), wherein the HeNB is linked with the MME via the HeNB gateway and a user plane does not pass through the HeNB gateway; and
    the HeNB gateway selecting, from the IPV4 and IPV6 addresses sent by the MME, an IP address matched with the IP version supported by the HeNB, and sending the IP address matched with the IP version supported by the HeNB to the HeNB;
    wherein the HeNB gateway acquiring the IP version supported by the HeNB comprises:
    the HeNB gateway acquiring the IP version supported by the HeNB that is sent by the HeNB to the HeNB gateway through an S1 message;
    wherein the S1 message is an S1 interface common message, and the S1 interface common message is one of the following messages: S1 SETUP REQUEST, and ENB CONFIGURATION UPDATE; or
    the S1 message is an S1 interface user equipment (UE) specific message, and the S1 interface UE specific message is one of the following messages: INITIAL UE MESSAGE, and PATH SWITCH REQUEST.

4. The method according to claim 3, wherein the HeNB gateway selecting, from the IPV4 and IPV6 addresses sent by the MME, an IP address matched with the IP version supported by the HeNB, and sending the IP address matched with the IP version supported by the HeNB to the HeNB comprises:
    the HeNB gateway receiving the IPV4 addresses and the IPV6 addresses sent by the MME; and
    the HeNB gateway selecting, according to the IP version supported by the HeNB, an IPV4 or IPV6 address matched with the IP version from the IPV4 addresses and the IPV6 addresses, and sending the IPV4 address or the IPV6 address to the HeNB.

5. A non-transitory computer storage medium, in which computer-executable instructions are stored and used for executing steps defined in claim 3.

6. A method for implementing hybrid networking, applied to a Mobility Management Entity (MME), comprising:
    the MME acquiring assigned Internet Protocol Version 4 (IPV4) addresses and Internet Protocol Version 6 (IPV6) addresses; and
    the MME sending the IPV4 addresses and the IPV6 addresses to a Home evolved Node B (HeNB) gateway;
    wherein the MME sending the IPV4 addresses and the IPV6 addresses to the HeNB gateway comprises:

the MME sending the assigned IPV4 addresses and IPV6 addresses to the HeNB gateway, for the HeNB gateway to select, according to an Internet Protocol (IP) version supported by an HeNB which refers to whether the HeNB supports IPV4 or IPV6, an IPV4 or IPV6 address matched with the IP version from the IPV4 addresses and the IPV6 addresses, and send the IPV4 address or the IPV6 address to the HeNB, wherein the IP version supported by the HeNB is sent by the HeNB to the HeNB gateway, the HeNB is linked with the MME via the HeNB gateway and a user plane does not pass through the HeNB gateway;

wherein the IP version supported by the HeNB is sent by the HeNB to the HeNB gateway through an S1 message;

wherein the S1 message is an S1 interface common message, and the S1 interface common message is one of the following messages: S1 SETUP REQUEST, and ENB CONFIGURATION UPDATE; or the S1 message is an S1 interface user equipment (UE) specific message, and the S1 interface UE specific message is one of the following messages: INITIAL UE MESSAGE, and PATH SWITCH REQUEST.

7. A non-transitory computer storage medium, in which computer-executable instructions are stored and used for executing steps defined in claim 6.

8. A Home evolved Node B (HeNB), comprising a processor configured to execute instructions stored in a non-transitory memory to perform following steps:

sending an Internet Protocol (IP) version supported by the HeNB, which refers to whether the HeNB supports IPV4 or IPV6, to a HeNB gateway, wherein the HeNB is linked with a Mobility Management Entity (MME) via the HeNB gateway and a user plane does not pass through the HeNB gateway;

receiving from the HeNB gateway an IP address matched with the IP version supported by the HeNB, wherein the HeNB gateway selects, from IPV4 addresses and IPV6 addresses sent by the MME, the IP address matched with the IP version supported by the HeNB, and sends the selected IP address to the HeNB; and setting up a service bearer according to the IP address;

wherein sending the IP version supported by the HeNB to the HeNB gateway comprises:

sending the IP version supported by the HeNB to the HeNB gateway through an S1 message;

wherein the S1 message is an S1 interface common message, and the S1 interface common message is one of the following messages: S1 SETUP REQUEST, and ENB CONFIGURATION UPDATE; or the S1 message is an S1 interface user equipment (UE) specific message, and the S1 interface UE specific message is one of the following messages: INITIAL UE MESSAGE, and PATH SWITCH REQUEST.

9. A Home evolved Node B (HeNB) gateway, comprising a processor configured to execute instructions stored in a non-transitory memory to perform following steps:

receiving an Internet Protocol (IP) version supported by an HeNB which refers to whether the HeNB supports IPV4 or IPV6, and receiving Internet Protocol Version 4 (IPV4) addresses and Internet Protocol Version 6 (IPV6) addresses sent by a Mobility Management Entity (MME), wherein the HeNB is linked with the MME via the HeNB gateway and a user plane does not pass through the HeNB gateway; and selecting, from the IPV4 and IPV6 addresses sent by the MME, an IP address matched with the IP version supported by the HeNB, and sending the IP address matched with the IP version supported by the HeNB to the HeNB;

wherein receiving the IP version supported by the HeNB comprises:

receiving the IP version supported by the HeNB that is sent by the HeNB to the HeNB gateway through an S1 message;

wherein the S1 message is an S1 interface common message, and the S1 interface common message is one of the following messages: S1 SETUP REQUEST, and ENB CONFIGURATION UPDATE; or the S1 message is an S1 interface user equipment (UE) specific message, and the S1 interface UE specific message is one of the following messages: INITIAL UE MESSAGE, and PATH SWITCH REQUEST.

10. The HeNB gateway according to claim 9, wherein selecting, from the IPV4 and IPV6 addresses sent by the MME, an IP address matched with the IP version supported by the HeNB, and sending the IP address matched with the IP version supported by the HeNB to the HeNB comprises:

receiving the IPV4 addresses and the IPV6 addresses sent by the MME, and selecting, according to the IP version supported by the HeNB, an IPV4 address or IPV6 address matched with the IP version from the IPV4 addresses and the IPV6 addresses, and sending the IPV4 address or the IPV6 address to the HeNB.

11. A Mobility Management Entity (MME), comprising a processor configured to execute instructions stored in a non-transitory memory to perform following steps:

acquiring assigned Internet Protocol Version 4 (IPV4) addresses and Internet Protocol Version 6 (IPV6) addresses; and sending the IPV4 addresses and the IPV6 addresses to a Home evolved Node B (HeNB) gateway;

wherein sending the IPV4 addresses and the IPV6 addresses to the HeNB gateway comprises:

sending the assigned IPV4 addresses and IPV6 addresses to the HeNB gateway, for the HeNB gateway to select, according to an Internet Protocol (IP) version supported by an HeNB which refers to whether the HeNB supports IPV4 or IPV6, an IPV4 or IPV6 address matched with the IP version from the IPV4 addresses and the IPV6 addresses, and send the IPV4 address or the IPV6 address to the HeNB, wherein the IP version supported by the HeNB is sent by the HeNB to the HeNB gateway, the HeNB is linked with the MME via the HeNB gateway and a user plane does not pass through the HeNB gateway;

wherein the IP version supported by the HeNB is sent by the HeNB to the HeNB gateway through an S1 message;

wherein the S1 message is an S1 interface common message, and the S1 interface common message is one of the following messages: S1 SETUP REQUEST, and ENB CONFIGURATION UPDATE; or the S1 message is an S1 interface user equipment (UE) specific message, and the S1 interface UE specific message is one of the following messages: INITIAL UE MESSAGE, and PATH SWITCH REQUEST.

* * * * *